United States Patent
Womersley

(10) Patent No.: US 10,358,293 B2
(45) Date of Patent: Jul. 23, 2019

(54) CONVEYOR CHAIN

(71) Applicant: PENNINE INDUSTRIAL EQUIPMENT LIMITED, Skelmanthorpe, Huddersfield (GB)

(72) Inventor: Graham Womersley, Huddersfield (GB)

(73) Assignee: PENNINE INDUSTRIAL EQUIPMENT LIMITED, Skelmanthorpe, Huddersfield (GB)

(*) Notice: Subject to any disclaimer, the term of this patent is extended or adjusted under 35 U.S.C. 154(b) by 0 days.

(21) Appl. No.: 15/867,395

(22) Filed: Jan. 10, 2018

(65) Prior Publication Data
US 2018/0194562 A1 Jul. 12, 2018

(30) Foreign Application Priority Data

Jan. 11, 2017 (GB) .................................. 1700441.7
May 12, 2017 (GB) .................................. 1707601.9

(51) Int. Cl.
| B65G 17/06 | (2006.01) |
| B65G 17/40 | (2006.01) |
| B65G 17/08 | (2006.01) |

(52) U.S. Cl.
CPC ............ *B65G 17/064* (2013.01); *B65G 17/08* (2013.01); *B65G 17/083* (2013.01); *B65G 17/40* (2013.01); *B65G 2201/0244* (2013.01); *B65G 2207/12* (2013.01)

(58) Field of Classification Search
CPC .. B65G 2207/12; B65G 17/08; B65G 17/064; B65G 17/083; B65G 17/40
USPC ................................. 198/850, 851, 852, 853
See application file for complete search history.

(56) References Cited

U.S. PATENT DOCUMENTS

| 1,529,243 | A | * | 3/1925 | Drake ..................... C03B 15/18 |
| | | | | 198/841 |
| 2,986,387 | A | * | 5/1961 | Illing ...................... F27B 9/243 |
| | | | | 110/269 |
| 3,160,264 | A | * | 12/1964 | Raybould ............ B65G 17/063 |
| | | | | 198/851 |
| 3,315,791 | A | * | 4/1967 | Vernon Flink ....... B65G 17/063 |
| | | | | 198/853 |
| 3,680,927 | A | | 8/1972 | Neureuther |
| 4,266,656 | A | | 5/1981 | Richard |
| 4,505,383 | A | | 3/1985 | Wheeldon et al. |
| 4,519,496 | A | | 5/1985 | Ludvigsen |
| 4,755,163 | A | | 7/1988 | Kanehira et al. |

(Continued)

FOREIGN PATENT DOCUMENTS

| DE | 1044707 B | 11/1958 |
| DE | 1807180 U | 3/1960 |

(Continued)

OTHER PUBLICATIONS

Extended EP Search Report for European Patent Application No. 18150852.4 completed May 22, 2018.

(Continued)

*Primary Examiner* — William R Harp
(74) *Attorney, Agent, or Firm* — Moore & Van Allen PLLC; Jeffrey R. Gray

(57) ABSTRACT

The present invention relates to a multi-link conveyor chain which may be used (for example) in the glass industry and to a retaining member for use in the multi-link conveyor chain.

14 Claims, 4 Drawing Sheets

(56) References Cited

U.S. PATENT DOCUMENTS

| | | | |
|---|---|---|---|
| 4,911,681 A | 3/1990 | Funkhouser | |
| 4,951,457 A | 8/1990 | Deal | |
| 5,042,244 A | 8/1991 | Worsley | |
| 5,197,593 A * | 3/1993 | Funkhouser | B65G 17/08 198/851 |
| 5,435,435 A | 7/1995 | Chiba et al. | |
| 5,586,644 A | 12/1996 | Coen et al. | |
| 5,678,683 A | 10/1997 | Stebnicki et al. | |
| 5,779,583 A | 7/1998 | Nakatani et al. | |
| 5,884,369 A | 3/1999 | Schick et al. | |
| 5,957,268 A | 9/1999 | Meulenkamp | |
| 6,036,002 A | 3/2000 | Kobayashi et al. | |
| 6,196,379 B1 | 3/2001 | Van Esch et al. | |
| 6,196,380 B1 | 3/2001 | Teuber et al. | |
| 6,213,292 B1 | 4/2001 | Takahashi et al. | |
| 6,247,582 B1 | 6/2001 | Stebnicki et al. | |
| 6,308,825 B1 | 10/2001 | Nakamura | |
| 6,662,545 B1 | 12/2003 | Yoshida | |
| 6,854,590 B2 | 2/2005 | Rudy et al. | |
| 6,952,916 B1 | 10/2005 | Fountaine | |
| 7,600,632 B2 * | 10/2009 | Hall | B65G 17/08 198/848 |
| 7,674,199 B2 | 3/2010 | Golden et al. | |
| 7,802,675 B2 * | 9/2010 | Hall | B65G 17/08 198/848 |
| 8,322,522 B2 | 12/2012 | Hall et al. | |
| 8,356,709 B2 | 1/2013 | Hall et al. | |
| 8,474,607 B2 * | 7/2013 | Hall | B65G 17/083 198/850 |
| 8,485,351 B2 | 7/2013 | Hall et al. | |
| 9,352,907 B2 * | 5/2016 | Westergaard | B65G 17/086 |
| 2002/0129732 A1 * | 9/2002 | Marshall | B65G 17/08 104/172.1 |
| 2003/0116409 A1 | 6/2003 | Marsetti et al. | |
| 2003/0168322 A1 | 9/2003 | Damkjaer | |
| 2006/0054472 A1 | 3/2006 | Hall | |
| 2006/0142103 A1 * | 6/2006 | Marshall | B65G 17/08 474/212 |
| 2009/0242360 A1 | 10/2009 | Hall | |
| 2009/0277758 A1 | 11/2009 | Marshall | |
| 2010/0236901 A1 * | 9/2010 | Marshall | B65G 17/08 198/851 |
| 2015/0027859 A1 * | 1/2015 | Westergaard | B65G 17/086 198/853 |

FOREIGN PATENT DOCUMENTS

| | | |
|---|---|---|
| DE | 8915287 U1 | 3/1990 |
| DE | 102006044371 A1 | 4/2007 |
| EP | 0288409 A1 | 10/1988 |
| EP | 1241117 A1 | 9/2002 |
| EP | 1445216 A2 | 8/2004 |
| EP | 1655242 A1 | 5/2006 |
| EP | 2275367 A2 | 1/2011 |
| EP | 2368816 A2 | 9/2011 |
| GB | 2309062 A | 7/1997 |
| WO | 9966161 A1 | 12/1999 |
| WO | 2004041685 A2 | 5/2004 |
| WO | 2004043833 A1 | 5/2004 |
| WO | 2006014910 A2 | 2/2006 |
| WO | 2007124749 A2 | 11/2007 |
| WO | WO2013029624 A1 | 3/2013 |

OTHER PUBLICATIONS

UNICHAINS—Plastic Modular BELT Catalog of Ammeraal Beltech Modular A/S (2008); 3pgs.

Identification Manual for Silent Chain, Member Companies of the Silent Chain Division American Sprocket Chain Manufacturers Association (1965); 8pgs.

"The Future is Pennine 'Premium' Conveyor Chain", Glass International: vol. 27, No. 5;(Sep./Oct. 2004); 5pgs.

Quality Conveying At the Hot End, Glass Machinery World Plants & Accessories; Year 16, Issue No. 4; (Jul./Aug. 2003); 4pgs.

"Crystal Clear: Safe Transport for Flawless Production", Rexroth Bosch Group; (2004); 16pgs.

"The Right Choice for Any Occasion", Rexroth Bosch Group; (2003); 12pgs.

* cited by examiner

CONVEYOR CHAIN

CROSS REFERENCE TO RELATED APPLICATION(S)

This application claims priority to United Kingdom Patent Application No. 1700441.7 filed on Jan. 11, 2017 and United Kingdom Patent Application No. 1707601.9 filed on May 12, 2017; the contents of which are also incorporated herein by reference.

FIELD

The present invention relates to a multi-link conveyor chain which may be used (for example) in the glass industry and to a retaining member for use in the multi-link conveyor chain.

BACKGROUND

Multi-link conveyor chains are in widespread use in the glass industry for transporting glass products between processing stations. For example, a multi-link conveyor chain which is typically 100 feet long may be used to transport blown glass from a blowing station to an annealing station. A multi-link conveyor chain may be used to transport small glassware such as perfume bottles, wine glasses, pharmaceutical glassware and decorated medicine bottles.

In one conventional multi-link conveyor chain, there is a plurality of parallel spaced apart elongate pins having an oval-shaped cross-section. Mounted on adjacent elongate pins are a series of link plates spaced apart along the pin by a plurality of washers, each link plate comprising a first and a second link. Each of the first and second links is capable of engaging a drive sprocket and has an oval-shaped aperture for receiving the elongate pin. The multi-link conveyor chain is driven by the engagement of the links of the link plate with the multiple teeth of a drive sprocket during a cycle of engagement. The conventional multi-link conveyor chain is assembled so that each end of the elongate pin extends beyond the outermost link plate (i.e. beyond the edge of the flat conveyor surface) and a pin head is fixed to each exposed end. Each end of the elongate pin is secured in a protective enclosure member (e.g. a head protector) that has a countersink to accommodate a pin head such that the pin head does not protrude from the enclosure member. One such arrangement is described in EP-A-1241117.

In the arrangement described in EP-A-1241117 and in other conventional arrangements described in inter alia EP-A-2368816, WO-A-2004/043833, US-A-2009/242360, US-A-2009/277758, U.S. Pat. No. 5,957,268, DE1044707 and U.S. Pat. No. 6,036,002, the protective enclosure member is equipped with twin bores to couple adjacent elongate pins.

The multi-link conveyor chain known as LIFEGUARD™ is a side guide conveyor chain which deploys interlocking enclosure members to provide a gap-free side profile.

SUMMARY OF THE INVENTION

The present invention seeks to improve multi-link conveyor chains by using single bore retaining members.

Thus viewed from one aspect the present invention provides a multi-link conveyor chain adapted to provide a substantially flat horizontal surface driveable between a first processing station and a second processing station by engagement with a drive sprocket, said multi-link conveyor chain comprising:

a plurality of elongate pins spaced apart in substantially parallel relationship consisting of multiple triplets of elongate pins being a first elongate pin adjacent to a second elongate pin adjacent to a third elongate pin,
   wherein the first elongate pin has a first end extending beyond a first edge of the substantially flat horizontal surface and a second end extending beyond a second edge of the substantially flat horizontal surface,
   wherein the second elongate pin has a first end extending beyond a first edge of the substantially flat horizontal surface and a second end extending beyond a second edge of the substantially flat horizontal surface,
   wherein the third elongate pin has a first end extending beyond the first edge of the substantially flat horizontal surface and a second end extending beyond the second edge of the substantially flat horizontal surface;

a plurality of substantially planar link plates each having a first link connected to a second link by a connecting portion, wherein each of the first link and the second link has a main body and a circumferentially dependent sprocket engaging member, wherein the main body defines an aperture whose shape essentially matches the section of an elongate pin whereby the plurality of substantially planar link plates is consecutively mounted interdigitally in a staggered relationship on the triplets of elongate pins;

a plurality of first retaining members mutually spaced apart at the first edge of the substantially flat horizontal surface adjacent to the link plates so as to enclose the first end of each of the plurality of elongate pins, wherein each of the first retaining members comprises a main body defining a single transverse bore, wherein the shape of the single transverse bore essentially matches the section of an elongate pin and the depth of the single transverse bore is sufficient to retain the first end of an elongate pin whereby the plurality of first retaining members includes a first retaining member mounted on the first elongate pin which is nested with a first adjacent first retaining member mounted on the second elongate pin which is nested with a second adjacent first retaining member mounted on the third elongate pin; and a plurality of second retaining members mutually spaced apart at the second edge of the substantially flat horizontal surface adjacent to the link plates so as to enclose the second end of each of the plurality of elongate pins, wherein each of the second retaining members comprises a main body defining a single transverse bore, wherein the shape of the single transverse bore essentially matches the section of an elongate pin and the depth of the single transverse bore is sufficient to retain the second end of an elongate pin whereby the plurality of second retaining members includes a second retaining member mounted on the first elongate pin which is nested with a first adjacent second retaining member mounted on the second elongate pin which is nested with a second adjacent second retaining member mounted on the third elongate pin.

The multi-link conveyor chain provides advantageously a continuous uninterrupted flat running surface and by virtue of the single transverse bore of the retaining members is straightforward to cut and rejoin.

Typically the first elongate pin, second elongate pin and third elongate pin are identical. References to "elongate pin" herein are intended to be a reference to any of the first elongate pin, second elongate pin and third elongate pin.

Preferably the elongate pin has a non-circular section. Particularly preferably the non-circular section of the elongate pin is substantially elliptical (or oval).

Typically the first retaining member and second retaining member are identical. References to "retaining member" herein are intended to be a reference to either or both of the first retaining member and second retaining member.

Preferably the first retaining member is nested with the first adjacent first retaining member in a non-overlapping fashion. Preferably the first retaining member is nested with the first adjacent first retaining member in a non-interlocking fashion. Preferably the first adjacent first retaining member is nested with the second adjacent first retaining member in a non-overlapping fashion. Preferably the first adjacent first retaining member is nested with the second adjacent first retaining member in a non-interlocking fashion.

Preferably the second retaining member is nested with the first adjacent second retaining member in a non-overlapping fashion. Preferably the second retaining member is nested with the first adjacent second retaining member in a non-interlocking fashion. Preferably the first adjacent second retaining member is nested with the second adjacent second retaining member in a non-overlapping fashion. Preferably the first adjacent second retaining member is nested with the second adjacent second retaining member in a non-interlocking fashion.

Preferably the first retaining member is nested with the first adjacent first retaining member in an overlapping fashion. Preferably the first retaining member is nested with the first adjacent first retaining member in an interlocking fashion. Preferably the first adjacent first retaining member is nested with the second adjacent first retaining member in an overlapping fashion. Preferably the first adjacent first retaining member is nested with the second adjacent first retaining member in an interlocking fashion.

Preferably the second retaining member is nested with the first adjacent second retaining member in an overlapping fashion. Preferably the second retaining member is nested with the first adjacent second retaining member in an interlocking fashion. Preferably the first adjacent second retaining member is nested with the second adjacent second retaining member in an overlapping fashion. Preferably the first adjacent second retaining member is nested with the second adjacent second retaining member in an interlocking fashion.

In a preferred embodiment, the retaining member comprises an elongate main body having an upper edge face substantially parallel to a lower edge face, wherein the upper edge face and lower edge face are connected at a leading end by a convex end face and at a trailing end by a concave end face, wherein the convex end face and concave end face are complementarily-shaped to facilitate nesting.

The convex end face may be substantially (e.g. partially or fully) S-shaped. The S-shape may be regular or irregular.

The concave end face may be substantially (e.g. partially or fully) S-shaped. The S-shape may be regular or irregular.

The convex end face may be substantially (e.g. partially or fully) V-shaped. The V-shape may be regular or irregular.

The concave end face may be substantially (e.g. partially or fully) V-shaped. The V-shape may be regular or irregular.

Preferably the convex end face is substantially (e.g. partially or fully) C-shaped. The C-shape may be regular or irregular.

Preferably the concave end face is substantially (e.g. partially or fully) C-shaped. The C-shape may be regular or irregular.

The convex end face may be transverse planar or non-planar.

The convex end face may be rectangular convex.

The concave end face may be transverse planar or non-planar.

The concave end face may be rectangular concave.

In a preferred embodiment, the convex end face is furcated. Particularly preferably the convex end face is bifurcated.

In a preferred embodiment, the concave end face is furcated. Particularly preferably the concave end face is bifurcated.

In a preferred embodiment, the convex end face is bifurcated to form a pair of convex end face sections and the concave end face is bifurcated to form a pair of concave end face sections, wherein the pair of convex end face sections and the pair of concave end face sections are complementarily-shaped to facilitate nesting.

Typically the main body defines a single transverse bore which is substantially elliptical (or oval).

The retaining member may be sized and configured so as to have a maximum radial extent which is equal to or less than the link plates. This ensures that the retaining member does not interfere with the substantially flat horizontal surface.

Preferably the main body of the retaining member defines a single non-circular transverse bore, wherein the shape of the single non-circular transverse bore essentially matches the non-circular section of the elongate pin.

Preferably the end of an elongate pin is retained in the single transverse bore by an interference fit. This assists the retaining member to articulate with the elongate pin.

The end of an elongate pin may be non-protrudingly retained in the single transverse bore.

The end of an elongate pin may be retained securely in the single transverse bore. For example, the end of an elongate pin may be retained securely in the single transverse bore by welding (preferably laser welding). Alternatively the end of an elongate pin may be threaded and may be retained securely in the single transverse bore by a threaded fastener.

Preferably the main body of each of the first link and second link of the link plate defines a non-circular aperture whose shape essentially matches the non-circular section of an elongate pin.

Preferably the main body of each of the first and the second link of a link plate defines an aperture (e.g. a non-circular aperture) whose shape non-identically matches the section (e.g. non-circular section) of the elongate pin. The non-identical match between the section of the elongate pin and the shape of the aperture defined by the main body of the link causes the link plate to be advantageously driven by the elongate pin throughout the cycle of engagement with the drive sprocket.

In a preferred embodiment, the circumferentially dependent sprocket engaging member of each of the first link and second link of the link plate is substantially flat-edged. Preferably each of the first link and second link of the link plate has a flat-edged, substantially teardrop profile.

Certain (e.g. all) link plates may be spaced apart by one or more spacers. The main body of the (or each) spacer may define a circular or non-circular aperture. In a preferred embodiment of the invention, each spacer comprises a main body defining a non-circular aperture for receiving the elongate pin whose shape essentially matches the non-circular section of the elongate pin.

Preferably the non-circular aperture defined by the main body of each of the first link and second link is substantially elliptical (or oval) with an enlarged side portion. Particularly preferably the enlarged side portion extends inwardly towards the connecting portion.

The multi-link conveyor chain of the invention is suitable for use in any industry which desires transportation between a first and a second station. For example, the multi-link conveyor chain of the invention could be used to transport automotive parts in the automotive industry.

Viewed from a further aspect the present invention provides a retaining member as hereinbefore defined.

BRIEF DESCRIPTION OF THE DRAWINGS

The present invention will now be described in a non-limitative sense with reference to the accompanying Figures as follows.

DETAILED DESCRIPTION OF EMBODIMENTS OF THE INVENTION

Figure 1A:
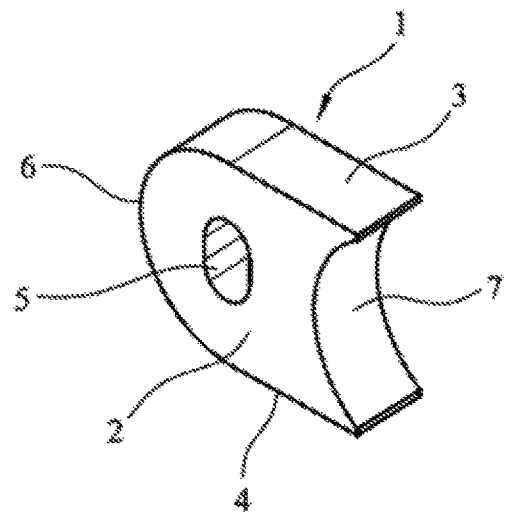
FIG. 1a illustrates a perspective view of a retaining member according to a first embodiment of the invention.

FIG. 1a illustrates a perspective view of a retaining member 1 according to a first embodiment of the invention. The retaining member 1 comprises an elongate main body 2 having an upper edge face 3 parallel to and spaced apart from a lower edge face 4. The upper edge face 3 and lower edge face 4 are connected at a leading end by a convex end face 6 and at a trailing end by a concave end face 7. The convex end face 6 and concave end face 7 are complementarily C-shaped. The main body 2 defines a single transverse bore 5 which is elliptical.

Figure 1B:
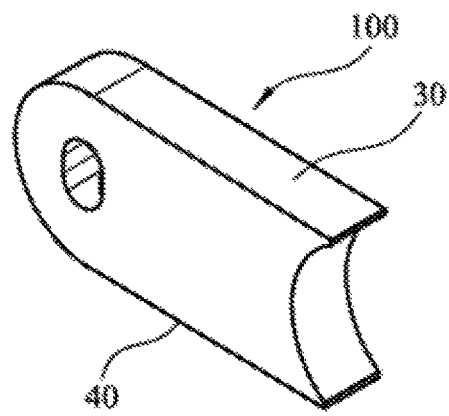
FIG. 1b illustrates a perspective view of a retaining member according to a second embodiment of the invention.

FIG. 1b illustrates a perspective view of a retaining member 100 according to a second embodiment of the invention. The retaining member 100 is largely identical to the retaining member 1 but the upper edge face 30 and lower edge face 40 are longer than the upper edge face 3 and lower edge face 4 and facilitate use of the retaining member 100 in a multi-link conveyor chain with an extended pitch.

Figure 1C:
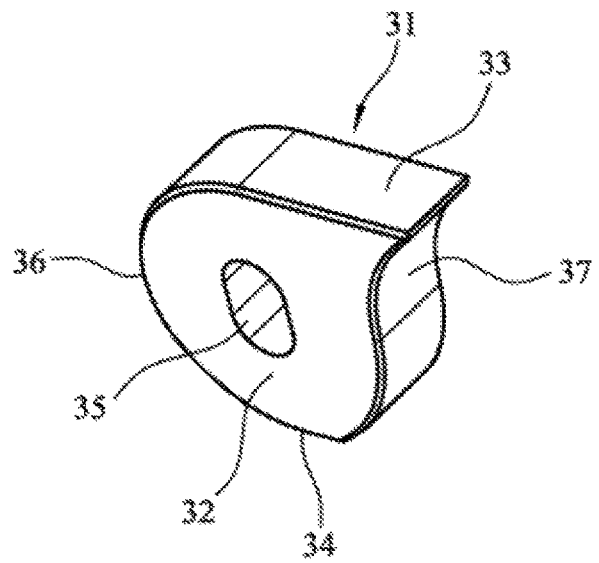
FIG. 1c illustrates a perspective view of a retaining member according to a third embodiment of the invention.

FIG. 1c illustrates a perspective view of a retaining member 31 according to a third embodiment of the invention. The retaining member 31 comprises an elongate main body 32 having an upper edge face 33 parallel to and spaced apart from a lower edge face 34. The upper edge face 33 and lower edge face 34 are connected at a leading end by a convex end face 36 and at a trailing end by a concave end face 37. The convex end face 36 and concave end face 37 are complementarily-shaped. The convex end face 36 has a regular C-shape whereas the concave end face 37 has an irregular S-shape. The main body 32 defines a single transverse bore 35 which is elliptical.

Figure 2:
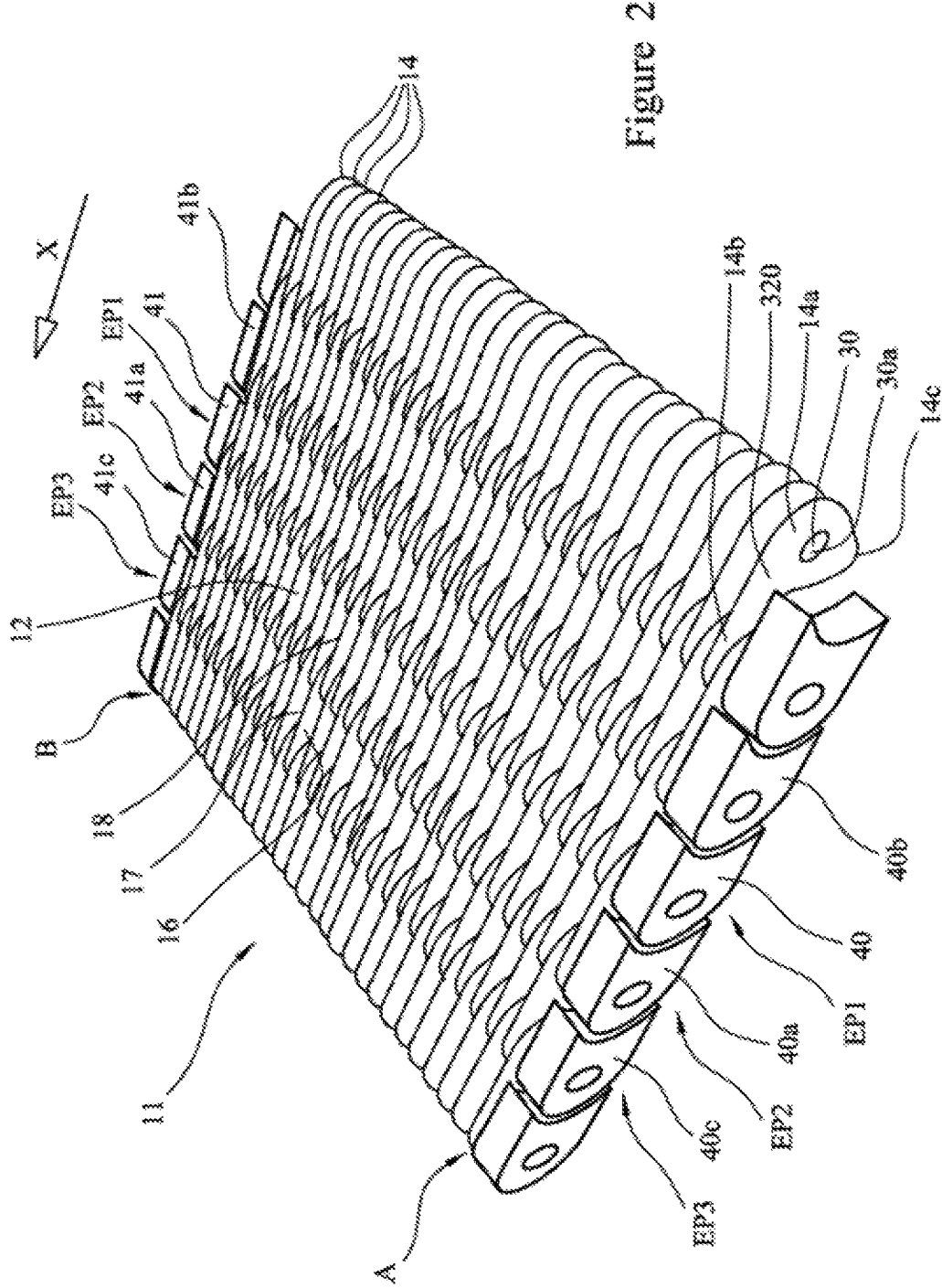
FIG. 2 illustrates in partial view a multi-link conveyor chain according to a first embodiment of the invention.

FIG. 2 illustrates in partial view a first embodiment of the multi-link conveyor chain of the invention designated generally by reference numeral 11. The multi-link conveyor chain 11 provides a flat surface 12 upon which may be carried articles such as glass bottles in a direction of transport X to a processing station.

The multi-link conveyor chain 11 comprises a plurality of elongate pins of elliptical section upon which are mounted a plurality of planar link plates 14. For the sake of clarity, the plurality of elongate pins is omitted from FIG. 2. However the elongate pins are mutually spaced apart in a substantially parallel relationship and consist of multiple triplets of elongate pins, each triplet being a first elongate pin adjacent to a second elongate pin adjacent to a third elongate pin. Consecutive link plates (16, 17 and 18 for example) are mounted interdigitally in a staggered fashion along one of the triplets of elongate pins (for example a first elongate pin (not illustrated but positioned at EP1), second elongate pin (not illustrated but positioned at EP2) and third elongate pin (not illustrated but positioned at EP3)).

Each of the plurality of link plates 14 has twin links 14a, 14b having a substantially teardrop profile which extends into a flat-edged, sprocket engaging tooth 14c. Each link 14a, 14b is connected by a connecting portion 320. A non-circular aperture 30 in each of links 14a, 14b non-identically matches the elliptical section of an elongate pin. The aperture 30 is substantially elliptical with an enlarged side portion 30a extending inwardly towards connecting portion 320.

A first retaining member 40 of a plurality of identical mutually spaced apart first retaining members 40, 40a, 40b, 40c is positioned at the first edge A of the flat surface 12 adjacent to the link plates 14. The first retaining member 40 is of the type described hereinbefore with reference to FIG. 1a. The convex end face 6 of the first retaining member 40 nests with the concave end face 7 of a first adjacent first retaining member 40a. The convex end face 6 of the first adjacent first retaining member 40a nests with the concave end face 7 of the second adjacent first retaining member 40c.

A second retaining member 41 of a plurality of identical mutually spaced apart second retaining members 41, 41a, 41b, 41c is positioned at the second edge B of the flat surface 12 adjacent to the link plates 14. The plurality of second retaining members 41, 41a, 41b, 41c is identical to the plurality of first retaining members 40, 40a, 40b, 40c.

The first retaining member 40 and second retaining member 41 are mounted on the first elongate pin (not illustrated but positioned at EP1). The first adjacent first retaining member 40a and first adjacent second retaining member 41a are mounted on the second elongate pin (not illustrated but positioned at EP2). The second adjacent first retaining member 40c and second adjacent second retaining member 41c are mounted on the third elongate pin (not illustrated but positioned at EP3). In each case, the single transverse bore 5 is an interference fit with the elongate pin which causes the retaining member to articulate with the elongate pin. In each case, the retaining member is laser-welded to the elongate pin.

Figure 3A:
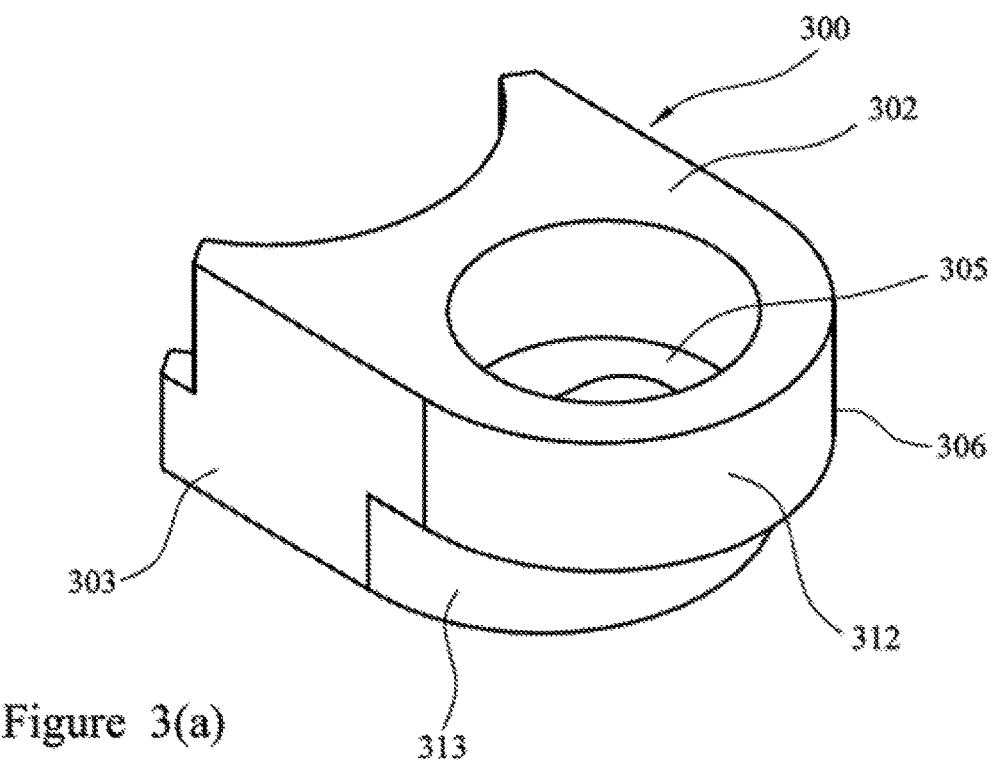
FIG. 3a illustrates a first opposing end view of a retaining member according to a fourth embodiment of the invention.

FIGS. 3(a) and (b) illustrate respectively opposite end views of a retaining member 300 according to a fourth embodiment of the invention. The retaining member 300 comprises an elongate main body 302 having an upper edge face 303 parallel to and spaced apart from a lower edge face 304. The upper edge face 303 and lower edge face 304 are connected at a leading end by a convex end face 306 and at a trailing end by a concave end face 307. The convex end face 306 is bifurcated to form a pair of convex end face sections 312 and 313. The concave end face 307 is bifurcated to form a pair of concave end face sections 310, 311. The concave end face section 310 complements the convex end face section 313 and the concave end face section 311 complements the convex end face section 312. The main body 302 defines a single transverse bore 305 which is elliptical.

Figure 4:
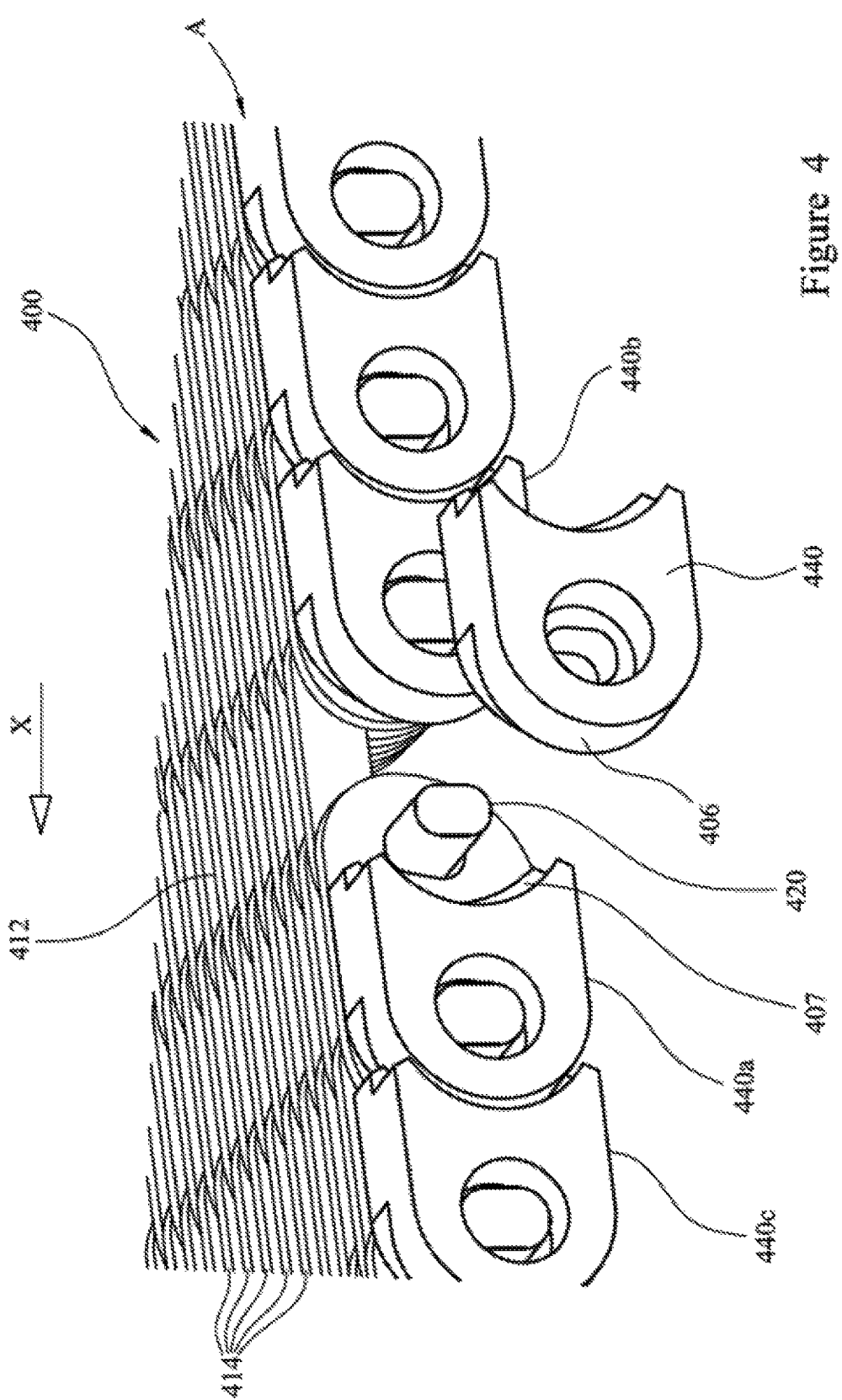
FIG. 4 illustrates a partial view a multi-link conveyor chain according to a second embodiment of the invention.

FIG. 4 illustrates in partial view a second embodiment of the multi-link conveyor chain of the invention designated generally by reference numeral 400. The multi-link conveyor chain 400 provides a flat surface 412 upon which may be carried articles such as glass bottles in a direction of transport X to a processing station.

The multi-link conveyor chain 400 comprises a plurality of elongate pins 420 of elliptical section upon which are mounted a plurality of planar link plates 414. The elongate pins 420 are mutually spaced apart in a substantially parallel relationship and consist of multiple triplets of elongate pins, each triplet being a first elongate pin adjacent to a second elongate pin adjacent to a third elongate pin. The link plates 414 are identical to those of the first embodiment described hereinbefore with reference to FIG. 2 and are mounted interdigitally in a staggered fashion along one of the triplets of elongate pins in the same way.

Figure 3B:
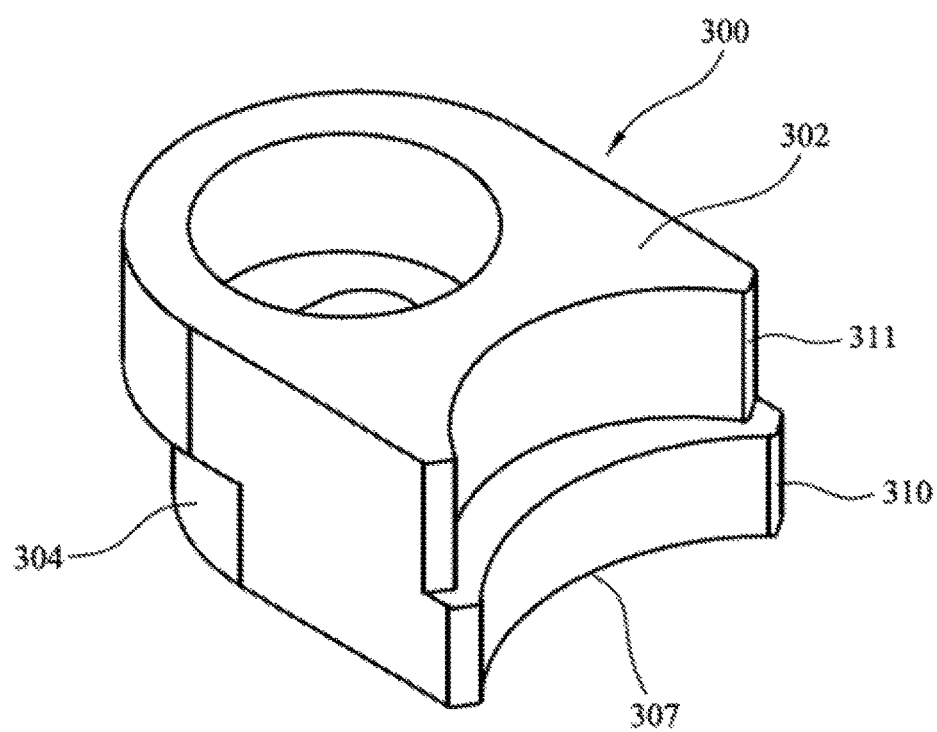
FIG. 3b illustrates a second opposing end view of a retaining member according to a fourth embodiment of the invention.

A first retaining member 440 of a plurality of identical mutually spaced apart first retaining members 440, 440a, 440b, 440c is shown detached from its working position at the first edge A of the flat surface 412 adjacent to the link plates 414. The first retaining member 440 is of the type described hereinbefore with reference to FIGS. 3a and 3b. The bifurcated convex end face 406 of the first retaining member 440 nests with the bifurcated concave end face 407 of a first adjacent first retaining member 440a. The bifurcated convex end face 406 of the first adjacent first retaining member 440a nests with the bifurcated concave end face 407 of the second adjacent first retaining member 440c. In each case, the pair of convex end face sections complements the pair of convex end face sections.

A plurality of mutually spaced apart second retaining members (not shown) identical to the plurality of first retaining members 40, 40a, 40b, 40c is positioned adjacent to the link plates 414 at the second edge of the flat surface 412 opposite to the first edge A.

The invention claimed is:

1. A multi-link conveyor chain adapted to provide a flat horizontal surface driveable between a first processing station and a second processing station by engagement with a drive sprocket, said multi-link conveyor chain comprising:
   a plurality of elongate pins spaced apart in parallel relationship consisting of multiple triplets of elongate pins being a first elongate pin adjacent to a second elongate pin adjacent to a third elongate pin,
      wherein the first elongate pin has a first end extending beyond a first edge of the flat horizontal surface and a second end extending beyond a second edge of the flat horizontal surface,
      wherein the second elongate pin has a first end extending beyond a first edge of the flat horizontal surface and a second end extending beyond a second edge of the flat horizontal surface, and
      wherein the third elongate pin has a first end extending beyond the first edge of the flat horizontal surface and a second end extending beyond the second edge of the flat horizontal surface;
   a plurality of planar link plates each having a first link connected to a second link by a connecting portion, wherein each of the first link and the second link has a main body and a circumferentially dependent sprocket engaging member, wherein the main body defines an aperture whose shape matches a section of an elongate pin whereby the plurality of planar link plates is consecutively mounted interdigitally in a staggered relationship on the triplets of elongate pins;
   a plurality of first retaining members mutually spaced apart at the first edge of the flat horizontal surface adjacent to the link plates so as to enclose the first end of each of the plurality of elongate pins, wherein each of the first retaining members comprises a main body defining a single transverse bore, wherein the shape of the single transverse bore matches the section of an elongate pin and the depth of the single transverse bore is sufficient to retain the first end of an elongate pin whereby the plurality of first retaining members includes a first retaining member mounted on the first elongate pin which is nested with a first adjacent first retaining member mounted on the second elongate pin which is nested with a second adjacent first retaining member mounted on the third elongate pin; and
   a plurality of second retaining members mutually spaced apart at the second edge of the flat horizontal surface adjacent to the link plates so as to enclose the second end of each of the plurality of elongate pins, wherein each of the second retaining members comprises a main body defining a single transverse bore, wherein the shape of the single transverse bore matches the section of an elongate pin and the depth of the single transverse bore is sufficient to retain the second end of an elongate pin whereby the plurality of second retaining members includes a second retaining member mounted on the first elongate pin which is nested with a first adjacent second retaining member mounted on the second elongate pin which is nested with a second adjacent second retaining member mounted on the third elongate pin;
   wherein each retaining member comprises an elongate main body having an upper edge face parallel to a lower edge face, wherein the upper edge face and the lower edge face are connected at a leading end by a convex end face and at a trailing end by a concave end face, wherein the convex end face and the concave end face are complementarily-shaped to facilitate nesting, wherein the convex end face is bifurcated to form a pair of convex end face sections and the concave end face is bifurcated to form a pair of concave end face sections, wherein the pair of convex end face sections and the pair of concave end face sections are complementarily-shaped to facilitate nesting.

2. The multi-link conveyor chain as claimed in claim 1, wherein the section of the elongate pin is elliptical.

3. The multi-link conveyor chain as claimed in claim 1, wherein the convex end face is C-shaped.

4. The multi-link conveyor chain as claimed in claim 1, wherein the concave end face is S-shaped.

5. The multi-link conveyor chain as claimed in claim 1, wherein the concave end face is C-shaped.

6. The multi-link conveyor chain as claimed in claim 1, wherein the main body defines the single transverse bore which is elliptical.

7. The multi-link conveyor chain as claimed in claim 1, wherein the end of an elongate pin is retained in the single transverse bore by an interference fit.

8. The multi-link conveyor chain as claimed in claim 1, wherein the end of an elongate pin is retained securely in the single transverse bore by laser welding.

9. The multi-link conveyor chain as claimed in claim 1, wherein the main body of each of the first link and the second link of the link plate defines a non-circular aperture whose shape matches the non-circular section of an elongate pin.

10. A retaining member comprising:
a main body defining a single transverse bore;
an upper edge face;
a lower edge face parallel to the upper edge face;
a leading end having a convex end face; and
a trailing end having a concave end face;
wherein the upper edge face and the lower edge face are connected at the leading end by the convex end face and the trailing end by the concave end face;
wherein the convex end face and the concave end face are complementarily-shaped to facilitate nesting with adjacent retaining members; and
wherein the convex end face is bifurcated to form a pair of convex end face sections and the concave end face is bifurcated to form a pair of concave end face sections, wherein the pair of convex end face sections and the pair of concave end face sections are complementarily-shaped to facilitate nesting.

11. The retaining member as claimed in claim 10, wherein the convex end face is C-shaped.

12. The retaining member as claimed in claim 10, wherein the concave end face is S-shaped.

13. The retaining member as claimed in claim 10, wherein the concave end face is C-shaped.

14. The retaining member as claimed in claim 10, wherein the main body defines the single transverse bore which is elliptical.

* * * * *